United States Patent [19]

Swenson et al.

[11] 4,275,550
[45] Jun. 30, 1981

[54] CROP BALER

[75] Inventors: Edward L. Swenson; Howard L. Ratzlaff, both of Hesston, Kans.

[73] Assignee: Hesston Corporation, Hesston, Kans.

[21] Appl. No.: 84,583

[22] Filed: Oct. 15, 1979

[51] Int. Cl.³ .................. B30B 9/30; A01D 39/00
[52] U.S. Cl. .................................. 56/341; 100/50
[58] Field of Search ............... 56/341, 342, 343; 100/50, 43

[56] References Cited

U.S. PATENT DOCUMENTS

| | | | |
|---|---|---|---|
| 4,034,543 | 7/1977 | Voth et al. | 56/341 |
| 4,118,918 | 10/1978 | White | 56/341 |
| 4,202,262 | 5/1980 | Claas et al. | 56/341 |

*Primary Examiner*—Robert A. Hafer
*Attorney, Agent, or Firm*—Schmidt, Johnson, Hovey & Williams

[57] ABSTRACT

As the baler advances across the field picking up windrowed crop material, the material is continuously packed into the lower, open end of an upwardly curved duct leading to the bottom of the main baling chamber. A loading fork sweeps upwardly through the duct at regular intervals to stuff an accumulated charge of materials up into the baling chamber from the duct, and a packer at the mouth of the duct continuously adds new material to the duct at such a rate as to precompress the charge of materials accumulating within the duct prior to stuffing thereof into the bale chamber. If the precompressed charge reaches a certain predetermined density level between stuffing cycles, the duct may expand transversely via a spring-loaded sidewall thereof to keep the charge from substantially exceeding the selected density level yet permit the uninterrupted infeed of still further material pending the next operation of the loading fork.

9 Claims, 7 Drawing Figures

CROP BALER

TECHNICAL FIELD

This invention relates to the field of crop balers of the type in which rectangular bales of crop material are formed within a baling chamber through the use of a reciprocating plunger as new charges of material are stuffed into the chamber at regular intervals.

BACKGROUND ART

The present invention is in certain respects an outgrowth of the principles set forth in U.S. Pat. No. 4,034,543 issued to Voth et al on July 12, 1977 and titled Crop Density Sensing Mechanism For Baler Loading Apparatus. In said patent, the importance of precompression of crop charges before they are introduced into the main baling chamber is discussed, although particularly in regard to the formation of relatively large bales weighing in the neighborhood of fifteen hundred to two thousand pounds. It is emphasized that formation of a perfectly shaped and densified charge of material prior to stuffing is so important that, in the event the forming charge has not fully accumulated within the loading duct prior to the time that such charge would normally be stuffed into the main baling chamber, the next successive stuffing cycle and any additionally required such cycles thereafter are skipped until such time as the proper charge has indeed been accumulated and prepared.

Such temporary halt in the stuffing cycles may be necessary in large balers of the type described in said patent because the windows which such a large baler receives are typically so small that the large loading duct simply cannot be filled to capacity and the charge properly densified by the time the next stuffing cycle is to begin. On the other hand, with smaller balers of the variety in which the produced bales are on the order of from forty to one hundred ten pounds, the window size has not been found to be a particular problem. Yet proper densification of each charge before stuffing the same into the bale case has been found to be extremely beneficial insofar as finished bale quality is concerned.

SUMMARY OF THE PRESENT INVENTION

Accordingly, one object of the present invention is to carry forward the precompression concepts set forth in said earlier patent in such a way as to make them particularly adaptable for use in smaller sized balers in which windrow size may not be problematical to the extent existing with respect to larger balers, yet the desire for dense, high quality, properly shaped bales is just as strong.

Pursuant to the above object, the present invention incorporates a special precompression loading duct to which incoming crop materials are directed prior to being stuffed into the main baling chamber. The volumetric capacity of the duct is so related to the feeding capacity of the means which deliver fresh material to the duct that the duct normally becomes completely filled with compacted material between successive stuffing cycles. Thus, the "charge" loaded up into the bale case is in a precompressed state. If the charge should reach a certain upper density level while accumulating in the duct, a sidewall of the duct may yield under the action of means such as a relief spring to prevent the density of the charge from substantially exceeding the selected level. Consequently, all charges loaded up into the bale chamber tend to be substantially the same density, and this results in finished bales which are properly shaped and densified throughout, which in turn promotes ease of handling, preciseness in stacking, and longevity in preservation.

DETAILED DESCRIPTION

Figure 1:
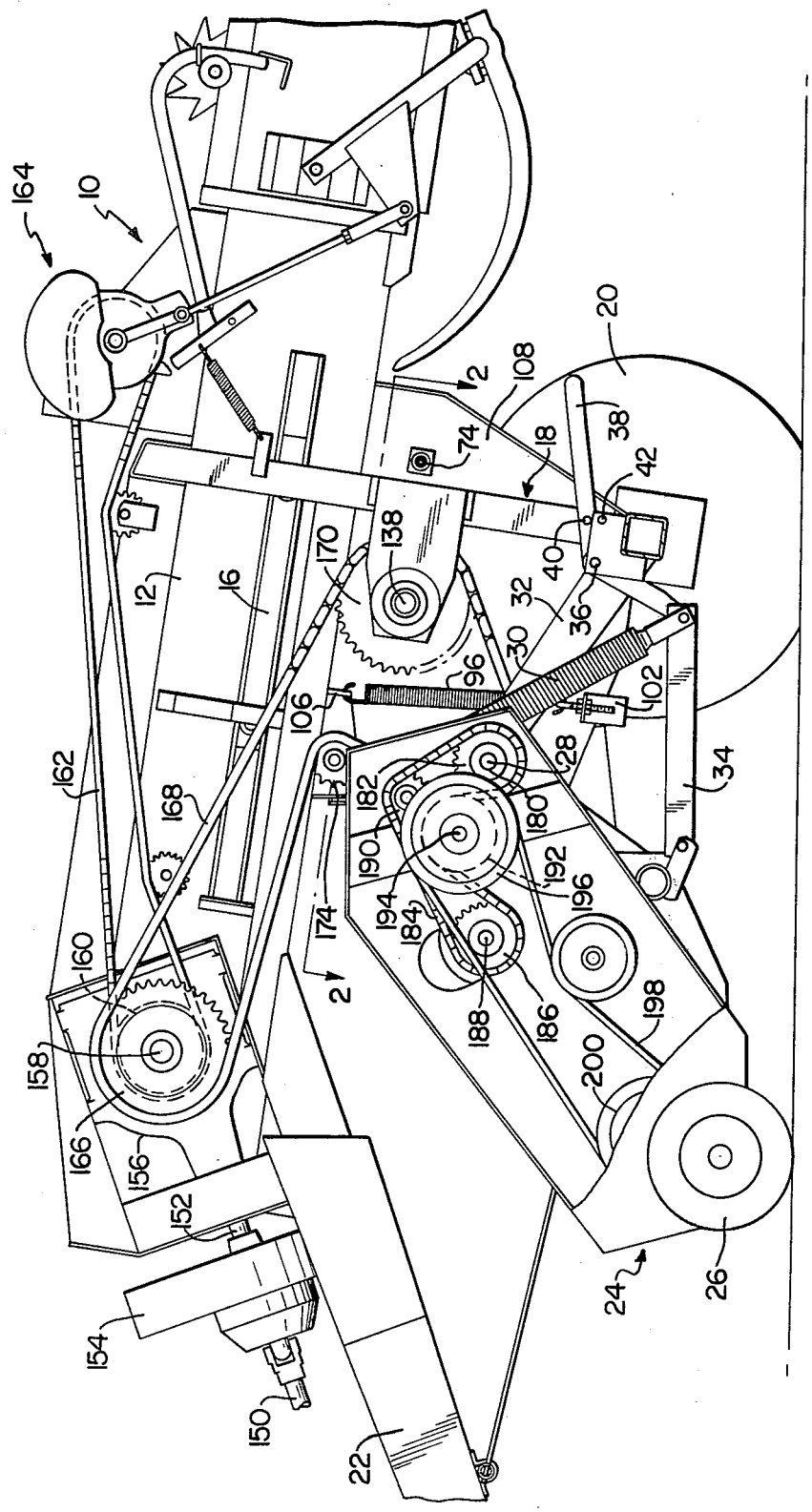
FIG. 1 is a fragmentary side elevational view of a baler incorporating the principles of the present invention.

The baler 10 is provided with an elongated, fore-and-aft extending bale case 12 defining an internal baling chamber 14 within which a plunger 16 reciprocates longitudinally. The bale case 12 is supported by a suitable frame 18 having ground wheels 20 (one only being shown) that adapt the machine 10 for advancement across the field, and a towing tongue 22 connected to the front of the frame 18 and the bale case 12 adapts the machine 10 for connection to a suitable towing vehicle (not shown) to effect said movement of the machine 10 across the field.

Figure 7:
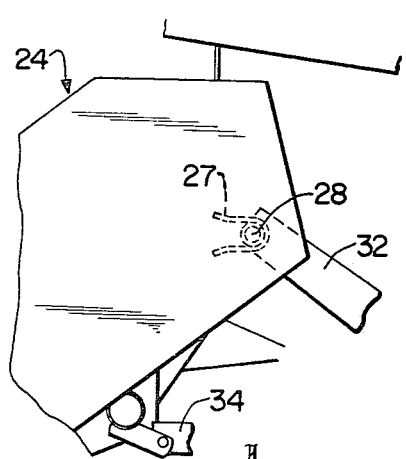
FIG. 7 is an enlarged, fragmentary, side elevational view of the crop pickup device and its associated mounting structure.
Figure 6:
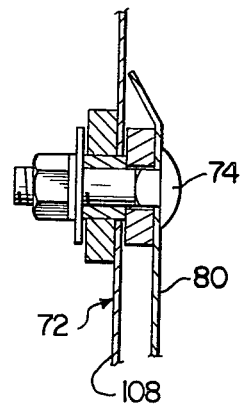
FIG. 6 is an enlarged, fragmentary detail view of one of the pivot points for the expanding portion of the duct.

The machine 10 includes a crop pickup 24 that is operable to lift windrowed crop materials off the ground as the machine 10 advances. Pickup 24 includes ground wheels 26 (one only being shown) at the lower front end thereof and is swingably attached to the frame 18 by yokes 27 for vertical swinging movement about an axis denoted by the numeral 28 in FIGS. 1 and 7. Flotation springs 30 (only one being shown) are connected between forwardly and upwardly extending members 32 of the frame 18 and a lower lifting linkage 34 attached to the pickup 24 below the axis 28 and pivotally attached to the frame 18 at 36 so as to provide flotation for the pickup 24. It is to be understood that during roading, the pickup 24 may be lifted entirely off the ground by swinging downwardly on the rearwardly extending arm 38 of linkage 34 until the hole 40 of arm 38 comes into registration with hole 42 in frame 18, whereupon a locking pin (not shown) may be inserted to releasably retain the pickup 24 in its lifted condition.

Figure 3:
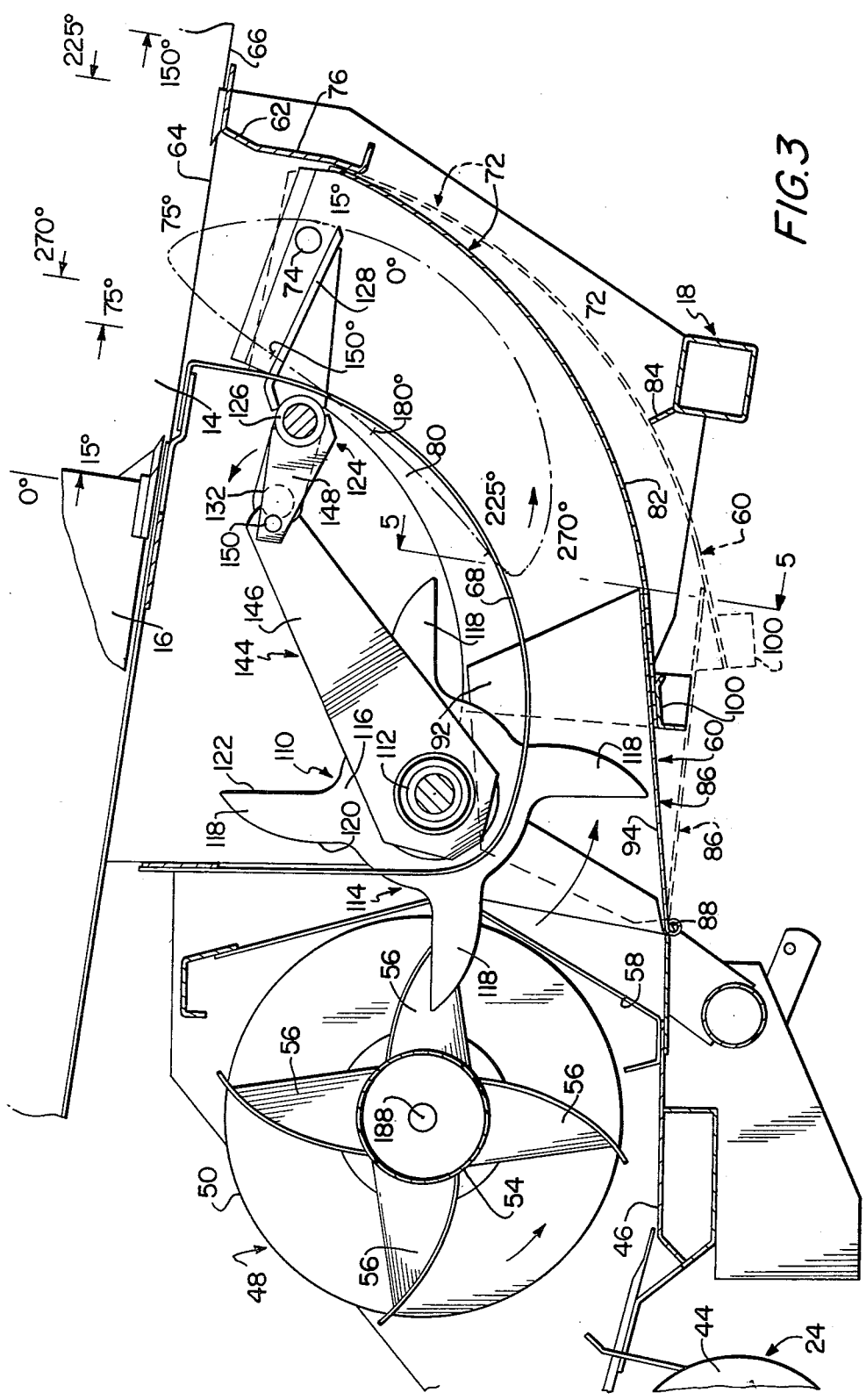
FIG. 3 is a fragmentary vertical cross sectional view of the baler taken substantially along line 3—3 of FIG. 2.
Figure 4:
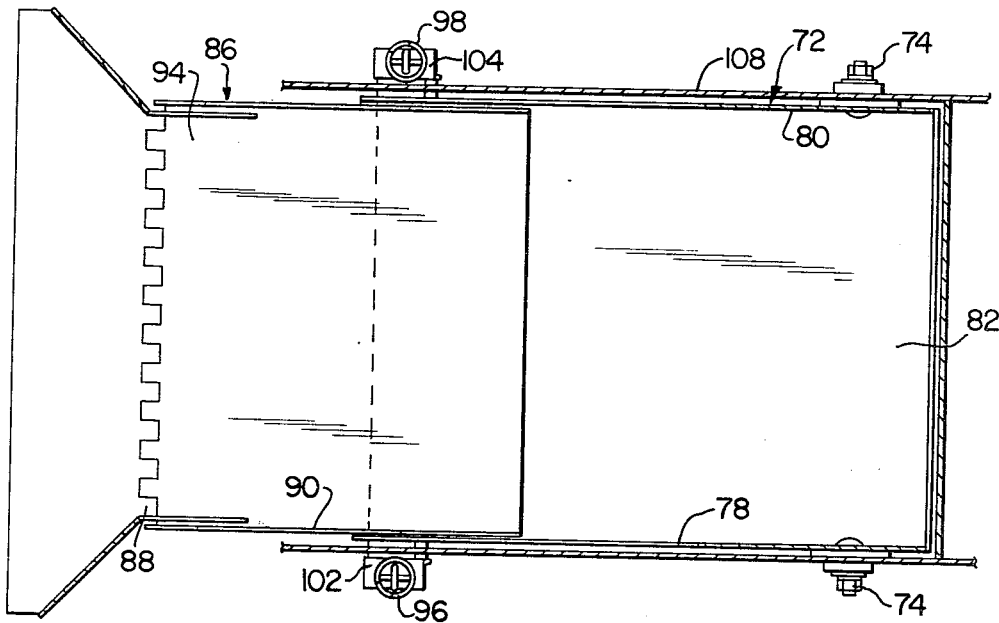
FIG. 4 is a fragmentary cross sectional view of the baler somewhat similar to FIG. 2 but with many components removed so as to reveal details of construction of the duct itself.

The pickup 24 includes any suitable device for lifting the crop material off the ground, and to this end a tined rotor 44 is illustrated in FIG. 3. The tined rotor 44 deposits the picked up crop material rearwardly onto a generally horizontally extending, transverse platform 46 situated behind and slightly above the rotor 44, whereupon the crop material is acted upon by a special center-gathering auger 48.

The auger 48 is situated transversely of the normal path of travel of the machine 10 in overlying relationship to the platform 46 and is provided with oppositely helically extending right-hand and left-hand flighting 50 and 52 for the purpose of gathering the material deposited on platform 46 centrally of the latter from outboard positions thereof. A centralmost portion 54 of the auger 48 is devoid of flighting and is of reduced diameter relative to the remaining outboard portions thereof such that additional clearance is provided between the auger 48 and the platform 46 along such central portion 54. Numerous generally radially outwardly projecting kickers 56 spaced circumferentially around the auger 48 in the central portion 54 thereof are operable to deliver the centrally gathered crop material under the auger 48 and into the rearwardly adjacent mouth 58 or outer end of a special loading duct 60 that curves upwardly to the bale case 12 and terminates in an inner open end 62 in registration with a bottom opening 64 in the floor 66 of the bale case 12.

The duct 60 is of course tubular between the outer mouth 58 thereof and the inner end 62 thereof, and one side of the duct 60 includes a top wall 68 that is generally U-shaped in elevation, originating at its forward end just rearwardly of the auger 48 in a slightly upwardly disposed location relative thereto, then extending downwardly to a position slightly below the level of the axis of rotation of the auger 48 where it curves rearwardly and thence upwardly in a gently upwardly extending configuration until reaching the floor 66 of the bale case 12. Laterally spaced apart, longitudinally extending slots 70 in the top wall 68 serve a function to be hereinafter described.

Figure 5:
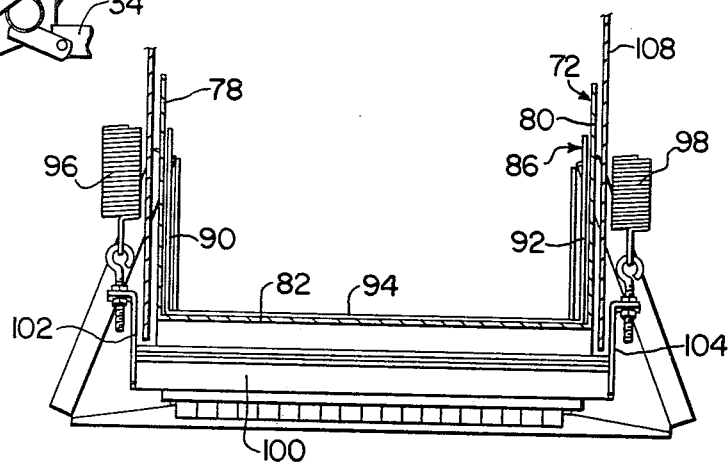
FIG. 5 is a fragmentary, transverse cross sectional view through the duct taken substantially along line 5—5 of FIG. 3.

In addition to the top wall 68, the other sides of the elongated duct 60 are also of special configuration and function so as to render the latter expandable in a transverse sense relative to the path of crop material travel therethrough. In this regard, a main arcuate portion 72 of the duct 60 is of generally U-shaped configuration when viewed in transverse cross section as illustrated in FIG. 5, such portion 72 having a pair of aligned horizontal pivots 74 at its upper end which swingably attach the portion 72 to structure (hereinafter the housing 108) depending from the bale case 12. The open uppermost end of the portion 72 is in front of the depending plate 76 such as to avoid making the duct 60 discontinuous at that location, and the portion 72 includes a pair of sidewalls 78, 80 interconnected along their lower extremities by a common bottom wall 82. As illustrated in FIG. 3, the portion 72 is swingable between a solid line position corresponding to the minimum volume condition of the duct 60 and a dotted line position corresponding to the maximum volume condition of the duct 60, the bottom wall 82 engaging with a positive stop 84 on the frame 18 when such maximum volume condition of the duct 60 is obtained.

The remainder of the duct 60 is defined by a forwardly disposed, generally U-shaped portion 86 as viewed in cross section in FIG. 5, such portion 86 being received within the lower open end of the portion 72 and overlapping the latter such as to yield a continuous effect for the duct 60 between its mouth 58 and upper discharge end 62. Portion 86 has at its front end a lower horizontal pivot 88 (FIG. 3) with the pickup 24 such as to permit swinging of the portion 86 with the portion 72 to the extent illustrated by the solid line and dotted line extremes in FIG. 3 corresponding to the minimum volume and maximum volume conditions of the duct 60 as heretofore explained. Portion 86, like the portion 72, includes a pair of sidewalls 90, 92 interconnected along their lowermost extents by a common bottom wall 94.

Expansion of the duct 60 from its minimum volume condition to its maximum volume condition is resisted by a pair of tension springs 96 and 98 situated on opposite lateral sides of the duct 60. A bar 100 fixed to the bottom wall 82 of portion 72 adjacent the lower end thereof traverses the latter and projects a short distance outboard therefrom where a pair of lugs 102 and 104 serve as anchor points for the lower ends of the springs 96 and 98 respectively. The upper ends of the springs 96, 98 are attached to suitable mounting ears 106 (only one being shown in FIG. 1) projecting laterally outwardly from a housing 108 that generally surrounds the duct 60 and shields the operator from various feeding components now to be described.

Figure 2:
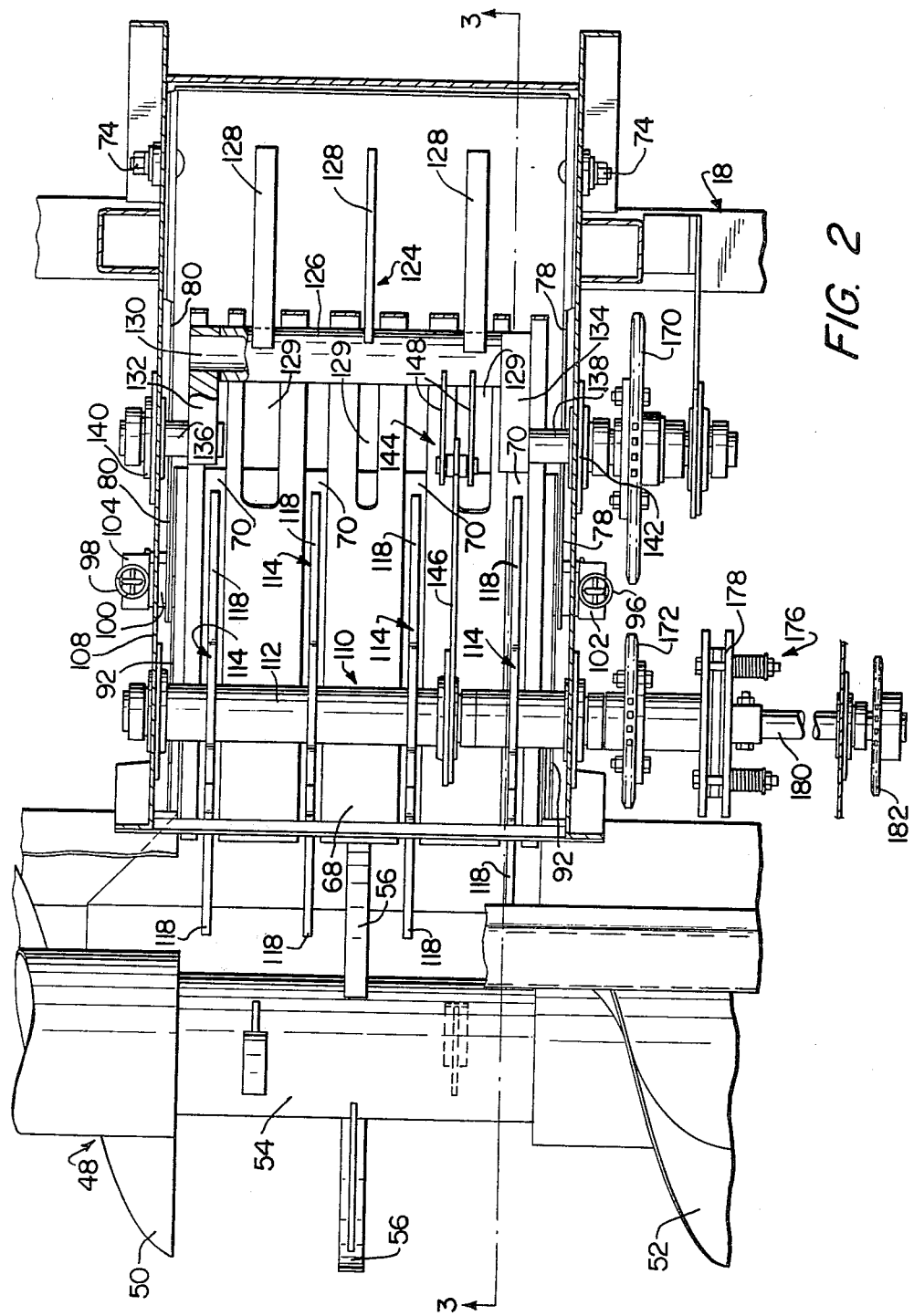
FIG. 2 is an enlarged, fragmentary generally horizontal cross sectional view through the baler taken substantially along 2—2 of FIG. 1.

Means for feeding new crop material into the duct 60 may in part take the form, for example, of a rotary packer 110. The packer 110 also serves as a means by which the material accumulating within the duct 60 is forcefully packed into a precompressed condition. To this end, the packer 110 includes a shaft 112 spanning the duct 60 above the top wall 68 thereof just rearwardly of the entry mouth 58. A series of pronged impellers 114 are secured to the shaft 112 at longitudinally spaced locations along the latter and in registration with corresponding slots 70 in the top wall 68. Each of the impellers 114 includes a radially inner hub section 116 of circular configuration and a series of radially outwardly projecting, circumferentially spaced apart prongs 118 integral with the hub 116. Each of the prongs has a non-radial, forwardly arched leading edge 120 curving gently back to a trailing edge 122 as the tip of the prong 118 is approached, the length of the prongs 118 being such that they project through the slots 70 for almost 270 degrees of rotative travel of the packer 110 so as to sweep downwardly and rearwardly through the mouth 58, thence along the portion 86 and upwardly through the top wall 68 adjacent the rear end of the portion 86. The tips of the prongs 118 come into close proximity with the bottom wall 94 of portion 86 during their rearward sweeping movement. As is clearly apparent, the packer 110 is situated slightly rearwardly adjacent the entry mouth 58 of the duct 60, and it will be noted as is particularly apparent in FIG. 2 that the impellers 114 are so situated along their common shaft 112 as to avoid interference with the radial kickers 56 associated with the auger 48.

In order to properly stuff a charge into the baling chamber 14 subsequent to formation thereof within the duct 60, a loader or stuffing fork 124 is provided that is continuously operating yet which makes loading sweeps through the duct 60 at only regular intervals (as opposed to making a continuous feeding motion as would be true if conveyor belts, etc. were employed). The fork 124 includes a transverse tube 126 situated above the top wall 68 generally adjacent the floor 66 of the bale case 12, such tube 126 substantially spanning the duct 60 tranversely thereof and having a plurality of elongated tines 128 projecting radially outwardly therefrom in a rearward direction in registration with a second set of slots 129 in top wall 68. The tube 126 is journaled at its opposite ends by trunnions 130 (only one being shown), said trunnions 130 in turn being affixed to and projecting inwardly from respective fore-and-aft extending crank arms 132 and 134. Each of the crank arms 132, 134 is fixedly secured adjacent its opposite end to a respective stub shaft 136 or 138, the stub shaft 136 projecting for a short distance through the proximal side of housing 108 where it is journaled by bearings 140, and the opposite stub shaft 138 extending for a greater distance through and beyond the corresponding sidewall of the housing 108 where the stub shaft 138 is journaled by bearings 142. An articulated, restricting linkage 144 consisting of a long link 146 freely rotatable on the shaft 112 of packer 110 and a pair of side-by-side, short links 148 having a pivot 150 at one end to the long link 146 and rigid to the tube 126 at the opposite end, forces the tines 128 to move in a generally kidney-shaped path of travel as illustrated in FIG. 3 when driving power is supplied to the stub shaft 138 in a counterclockwise direction viewing FIG. 1.

In order to drive the various components hereinabove described, the machine 10 is provided with a drive line 150 running along the top side of the tongue 22 for connection with the power take-off shaft of a towing vehicle. At its rear end, the drive line 150 is connected to a fore-and-aft extending shaft 152 fixedly carrying a flywheel 154, the shaft 152 leading into the forward end of a right angle gearbox 156. A transversely extending output shaft 158 of the gearbox 156 carries a first sprocket 160 and trained by a drive chain 162 that leads rearwardly to bale tying mechanism denoted broadly by the numeral 164 of any suitable design. As is well understood by those skilled in the art, the tying mechanism 164 is operable at intermittent intervals when produced bales have reached preselected sizes to wrap the bales with strands of twine or wire and thereupon form a knot so as to securely bind the finished bales.

By means not shown herein, the plunger 16 is drivingly connected to the drive line 150 such as to continuously reciprocate the plunger 16 between the fully retracted extreme indicated by the notation "0°" in FIG. 3 and a fully extended extreme position slightly beyond the notation "150" in that same Figure. In so doing, the plunger 16 moves into and out of covering relationship with the opening 64 such as to close the latter during a certain interval of each compression stroke and of the immediately subsequent retraction stroke.

A second, outer sprocket fixed to the output shaft 158 of the gearbox 156 is entrained by a drive chain 168 which wraps around a sprocket 170 fixed to the outer end of stub shaft 138. Additionally, the chain 168 wraps around a sprocket 172 (FIG. 2) fixed to the outer end of the shaft 112 associated with packer 110 before passing around an idler 174 (FIG. 1) and returning to the sprocket 166. Thus, both the stuffing fork 124 and the packer 110 received direct driving power from the output shaft 158 of the gearbox 156.

In contrast, the operating components associated with the pickup 24 receive their driving power indirectly from the gearbox 156 and in such a way as to permit these components to temporarily become disabled in the event that they are delivering crop material to the duct 60 more rapidly than the packer 110 and the stuffing fork 124 can handle such material. To this end, mechanism broadly denoted by the numeral 176 drivingly interconnects the auger 48 and the tined rotor 44 with the packer 110, such mechanism 176 including, as illustrated particularly in FIG. 2, relief means in the nature of a suitable, spring loaded friction clutch 178 that, when engaged, drivingly connects the shaft 112 of packer 110 with an axially aligned shaft 180 projecting beyond the left end of the shaft 112 as the machine 10 is viewed from the rear thereof. The clutch 178 is normally engaged such that a sprocket 182 fixed to the outermost end of the shaft 180 normally rotates with the shaft 112 of the packer 110 and in the same direction.

The sprocket 182 is in turn entrained by a drive chain 184 entrained at its forwardmost and around a sprocket 186 fixed to the outer end of a shaft 188 of the auger 48. Additionally, the chain 184 is entrained around an idler 190 and around a driven sprocket 192 associated with a jackshaft 194 located generally midway between the shafts 180 and 188. The jackshaft 194 in turn carries a sheave 196 that is wrapped around by a belt 198 which extends forwardly to and in turn encircles a sheave 200. Sheave 200 is fixed to the outer end of a drive shaft (not shown) fixed to the tined rotor 44 to drive the latter.

Operation

As the machine 10 advances across a field having windrowed crop material lying thereon, such material is continuously picked up by the pickup rotor 44 and delivered rearwardly onto the platform 46, whereupon the material is center-gathered by the auger 48 and delivered rearwardly into the entry mouth 58 of the duct 60 by the kickers 56. As hereinabove mentioned, the relieved or reduced diameter central portion 54 of the auger 48 is particularly beneficial in that it avoids a clogging action which might otherwise occur at the point where the widespread amounts of crop material are converged into a common, heavy flow of crop material. Generally speaking, material fed into the duct 60 by the auger 48 and by the cooperating packer 110 is formed into successive charges of material that are in turn successively stuffed up into the baling chamber 14 by the continuously and cyclically operating fork 124. As each such charge is stuffed into the bale chamber 14 in timed relationship to reciprocation of the plunger 16, the latter compacts the same rearwardly against previously compacted amounts of material, and the forming bales are incrementally inched along the floor 66 of the bale case 12 until a discharge orifice (not shown) at the rearmost end of the bale case 12 is reached, whereupon the finished bales drop to the ground after having first being bound by the tying mechanism 164. As is well understood by those skilled in the art, the necessary resistance to compactive action of the plunger 16 so as to further densify the charges stuffed up into the baling chamber 14 is supplied by virtue of the restrictive nature of the discharge orifice of the bale case 12.

As a charge is swept upwardly into the bale chamber 14 ahead of the retracted plunger 16, the duct 60 returns to a minimum volume condition thereof exemplified in solid lines in FIG. 3, during which condition it will be seen that the bottom wall 82 of the portion 72 of duct 60 is spaced well above the positive limit stop 84 therefor. However, the volumetric capacity of the duct 60 during such minimum volume condition thereof is so related to the feeding capacity of the packer 110, the auger 48 and the pickup rotor 44 that the duct 60 normally fills up with crop material rather quickly as the fork 124 is finishing its stuffing stroke and is moving along its return stroke between the positions designated "75°" and "225°" in FIG. 3. Consequently, the material fed into the mouth 58, particularly under the packing influence of the packer 110, begins to become compressed into a relatively cohesive mass (the plunger 16 covers the opening 64 at this time and thus prevents escape of the trapped material within the duct 60).

The resistance of the springs 96 and 98 is so selected that they will hold the portions 72 and 86 in their minimum volume positions until such time as the density of the charge accumulating within the duct 60 reaches a certain, predetermined upper level. If the charge never obtains that density level before the next stuffing cycle of the fork 124 has commenced, then the charge will be loaded up into the bale case 12, without the duct 60 ever expanding beyond its minimum volume condition. But if instead conditions are such that the selected density level is reached before the fork 124 can clear out the duct 60, the latter can expand transversely toward its maximum volume condition so as to accept additional crop material without substantially raising the density of the charge. Consequently, all of the charges prepared for the bale case 12 tend to be of the same density, resulting in high quality bales in terms of shape, density and integrity that are spoilage-resistant and are conductive to precision stacking. It is important to note that the springs 96 and 98 represent but one way in which expansion of the duct 60 may be controlled. The important fact is that the duct 60 can indeed expand transversely if and when needed, rather than that resilient springs are the particular means used to effect the necessary control. Hydraulic, electrical or other forms of mechanical controls could conceivably be employed.

Additionally, it is important to recognize that the packing action taking place in the duct 60 is endwise in nature as opposed to being caused by forces along the sides of the duct 60. All sides of the duct 60 remain devoid of structure moving in the direction of the subsequent stuffing action by fork 124 such that their sole purpose is to confine and compact, rather than to feed. This results in excellent precompression of the charges.

It is further important to note that precompression of the crop charges of which the bale is comprised eliminates part of the compression that would otherwise have to take place within the main bale chamber 14. Thus, the stroke of the plunger 16 can be shorter than would otherwise be necessary. This can be a quite significant factor from the standpoint of mechanical reliability, lack of vibration and noise, etc. and is made possible because, assuming a given number of plunger cycles per minute, the plunger itself can move more slowly during each of such cycles since a shorter distance must be traversed.

It is also significant that the pickup 24 is mounted for swinging movement about the same axis (axis 28) as the packer 110. Thus, in spite of the fact that the pickup 24 may rise and fall over varying ground contrours, the feeding relationship between the auger kickers 56 and the packer 110 remains unchanged. Consequently, fewer problems in misfeed can be expected.

We claim:

1. A crop baler including:
   an elongated bale forming chamber having a laterally disposed opening therein;
   compacting mechanism including a plunger continuously reciprocable within said chamber longitudinally thereof across said opening to open and close the latter;
   an elongated, tubular duct projecting laterally outwardly from said chamber in registration with said opening;
   means positioned at a mouth at the outer end of said duct for continuously feeding crop material into the duct to accumulate a charge thereof;
   a loader associated with said duct for stuffing successively accumulating charges from the duct into said chamber in timed relationship to reciprocation of said plunger, and at regular intervals,
   said duct being transversely expandable from a minimum volume position toward a maximum volume position; and
   control means for preventing said expansion of the duct unless the density of a charge of material accumulating in said duct reaches a certain predetermined level,
   said duct having a wall thereof extending along the path of travel of material from the feeding means into the duct and yieldably shiftable transversly of said path of travel for permitting said expansion of the duct.

2. A baler as claimed in claim 1, wherein said shiftable wall includes a portion swingable about a pivot adjacent the inner end of the duct to permit said shifting of the wall.

3. A baler as claimed in claim 2, wherein said shiftable wall further includes a second portion swingable about a pivot adjacent the mouth of the duct to permit said shifting of the wall, said portions mutually overlapping between said ends of the duct.

4. A baler as claimed in claim 1, wherein said baling chamber is generally horizontally disposed and said opening is located in the bottom thereof, said duct projecting downwardly from said opening in disposition below the baling chamber.

5. A baler as claimed in claim 4, wherein said duct includes a bottom wall curving upwardly from said feeding means to said inlet, said wall including a pair of mutually overlapping portions swingable about respective pivots at the inner and outer ends of the duct so as to permit said expansion of the duct.

6. A baler as claimed in claim 1, wherein said baling chamber is provided with means rendering the same adapted for movement across a field having crop materials thereon, said feeding means including means for picking up crop material from the ground during said movement of the chamber.

7. A baler as claimed in claim 1, wherein said feeding means includes a platform across the mouth of said duct and wider than said mouth, said feeding means further including an auger overlying said platform in transverse relation to said duct and provided with flighting operable to gather outboard baling material centrally on the platform into registration with said mouth of the duct, said auger having a central portion thereof devoid of said flighting and of reduced diameter relative to the remaining portions of the auger, said central portion having means for delivering the centrally gathered material into said mouth of the duct.

8. A baler as claimed in claim 1, wherein said feeding means includes a rotary-driven packer positioned closely adjacent the downstream side of said mouth of the duct and a rotary feeder positioned closely adjacent the upstream side of said mouth of the duct, said feeder having mechanism operably connecting the same with said packer for receiving driving power therefrom, said mechanism including relief means operable to temporarily disconnect said feeder from the packer upon attempted overloading of the duct by said feeder.

9. A baler as claimed in claim 1, wherein said control means includes yieldable spring means.

* * * * *